US012724930B2

(12) United States Patent
Ramirez-Corrales et al.

(10) Patent No.: US 12,724,930 B2
(45) Date of Patent: Sep. 1, 2026

(54) GENERATION OF A CRYPTOGRAPHIC KEY FROM AN SRAM MEMORY

(71) Applicant: COMMISSARIAT A L'ENERGIE ATOMIQUE ET AUX ENERGIES ALTERNATIVES, Paris (FR)

(72) Inventors: Maria Ramirez-Corrales, Grenoble Cedex (FR); Jean-Philippe Noel, Grenoble Cedex (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 18/910,084

(22) Filed: Oct. 9, 2024

(65) Prior Publication Data

US 2025/0124175 A1 Apr. 17, 2025

(30) Foreign Application Priority Data

Oct. 12, 2023 (FR) ....................................... 2310968

(51) Int. Cl.
*G06F 21/72* (2013.01)
*G06F 21/64* (2013.01)

(52) U.S. Cl.
CPC .............. *G06F 21/72* (2013.01); *G06F 21/64* (2013.01)

(58) Field of Classification Search
CPC ................................ G06F 21/72; G06F 21/64
USPC .......................................................... 726/26
See application file for complete search history.

(56) References Cited

U.S. PATENT DOCUMENTS

| | | | | |
|---|---|---|---|---|
| 7,725,740 | B2 * | 5/2010 | Kudelski | G07F 7/1016 726/4 |
| 12,413,426 | B2 * | 9/2025 | Brockhaus | H04L 9/3263 |
| 2013/0051552 | A1 * | 2/2013 | Handschuh | H04L 9/0897 380/44 |
| 2019/0165956 | A1 * | 5/2019 | Adham | H04L 9/0866 |

(Continued)

FOREIGN PATENT DOCUMENTS

CN 105530097 B 9/2018

OTHER PUBLICATIONS

Preliminary French Search Report issued May 14, 2024 in French Application 2310968 filed on Oct. 12, 2023, 11 pages (with English Translation of Categories of Cited Documents & Written Opinion).

(Continued)

*Primary Examiner* — Teshome Hailu
(74) *Attorney, Agent, or Firm* — Oblon, McClelland, Maier & Neustadt, L.L.P.

(57) ABSTRACT

A method is for generating a cryptographic key from an SRAM memory and device implements such a method. The method includes steps of biased initialisation of a first set of cells located in a first region of the SRAM memory so as to promote the establishment, in a first logic state, of the cells of the first set, storing, in a second set of cells of a second region of the memory, the respective states of the cells of the first set and resulting from the first biased initialisation, then, performing a second biased initialisation of the first set of cells so as to promote a setting in a second logic state, complementary to the first logic state, the cells of the first set. The method further includes, after the first biased initialisation and the second biased initialization, establishing an N-bit digital key.

15 Claims, 7 Drawing Sheets

(56) References Cited

U.S. PATENT DOCUMENTS

| | | | |
|---|---|---|---|
| 2019/0221254 A1 | 7/2019 | Liu et al. | |
| 2019/0253402 A1* | 8/2019 | Kärkkäinen | H04L 63/068 |
| 2021/0192051 A1* | 6/2021 | Waldron | H04L 9/08 |
| 2022/0199151 A1 | 6/2022 | Liu et al. | |

OTHER PUBLICATIONS

Laban et al., "Leakage free helper data storage in microcontroller based PUF implementation", Microprocessors and Microsystems, 87, 2021, 8 pages.

* cited by examiner

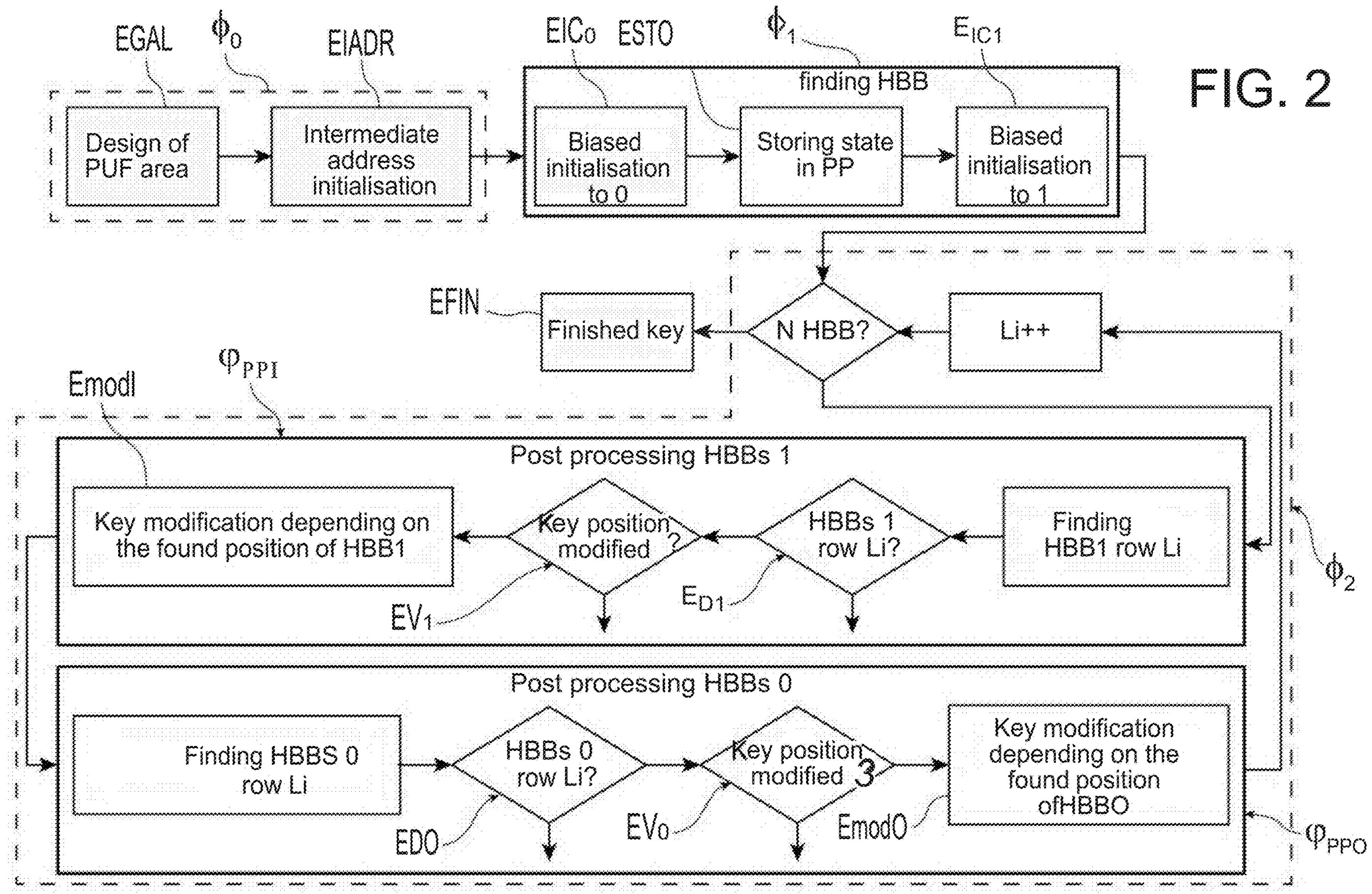
FIG. 2
EGAL
$\phi_0$
EIADR
$EIC_0$
ESTO
$\phi_1$
$E_{IC1}$
Design of PUF area
Intermediate address initialisation
finding HBB
Biased initialisation to 0
Storing state in PP
Biased initialisation to 1
$\phi_2$
Li++
N HBB?
Finished key
EFIN
$\varphi_{PPI}$
Emodl
Post processing HBBs 1
Key modification depending on the found position of HBB1
Key position modified?
HBBs 1 row Li?
Finding HBB1 row Li
$EV_1$
$E_{D1}$
$\varphi_{PPO}$
Post processing HBBs 0
Finding HBBS 0 row Li
HBBs 0 row Li?
Key position modified 3
Key modification depending on the found position ofHBBO
EDO
$EV_0$
Emod0

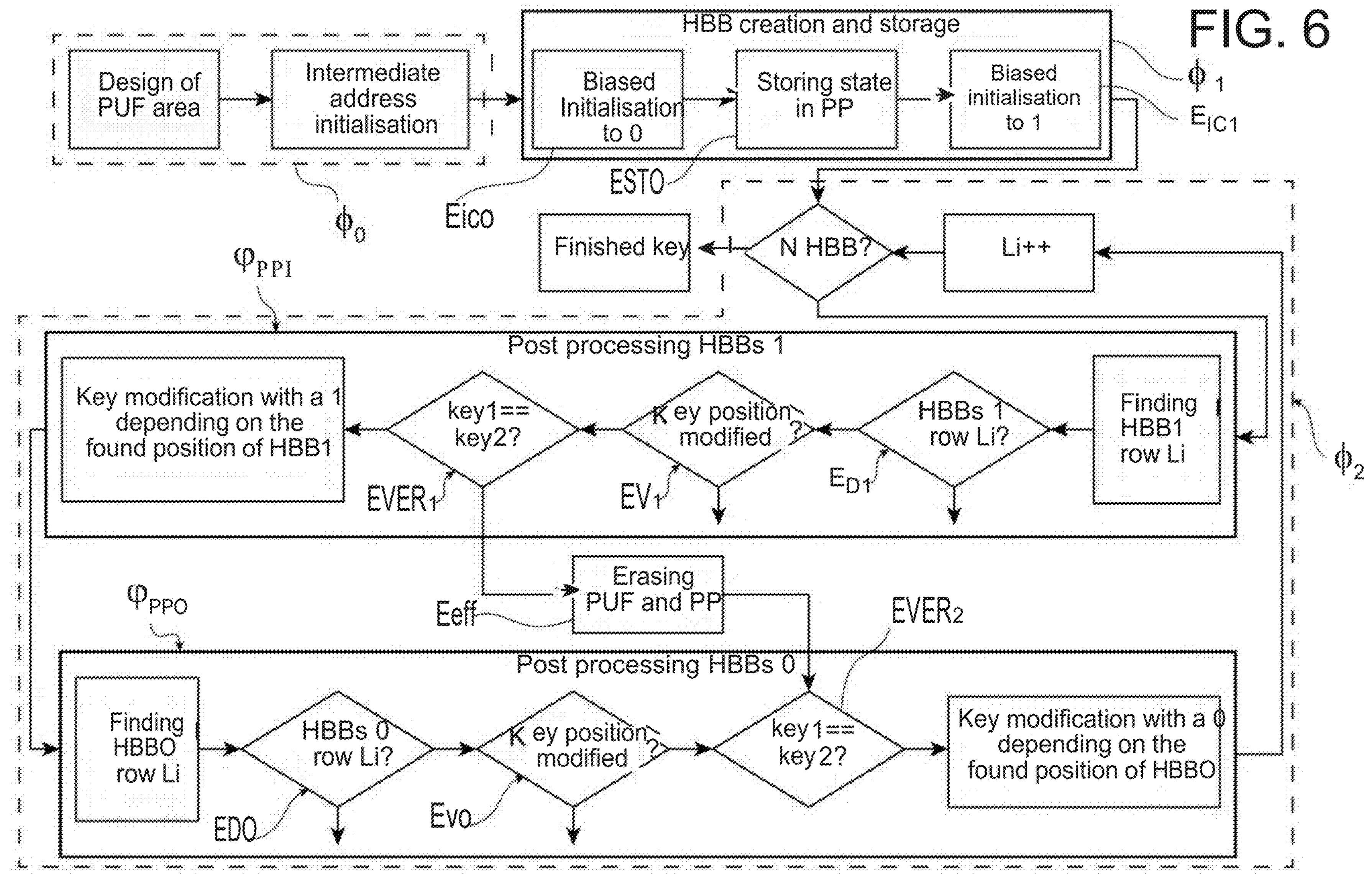
FIG. 6
HBB creation and storage
Design of PUF area
Intermediate address initialisation
Biased Initialisation to 0
Storing state in PP
Biased initialisation to 1
ϕ1
EIC1
ϕ0
Eico
ESTO
Finished key
N HBB?
Li++
φPPI
Post processing HBBs 1
Key modification with a 1 depending on the found position of HBB1
key1== key2?
Key position modified ?
HBBs 1 row Li?
Finding HBB1 row Li
EVER1
EV1
ED1
ϕ2
Erasing PUF and PP
φPPO
Eeff
EVER2
Post processing HBBs 0
Finding HBBO row Li
HBBs 0 row Li?
Key position modified ?
key1== key2?
Key modification with a 0 depending on the found position of HBBO
EDO
Evo

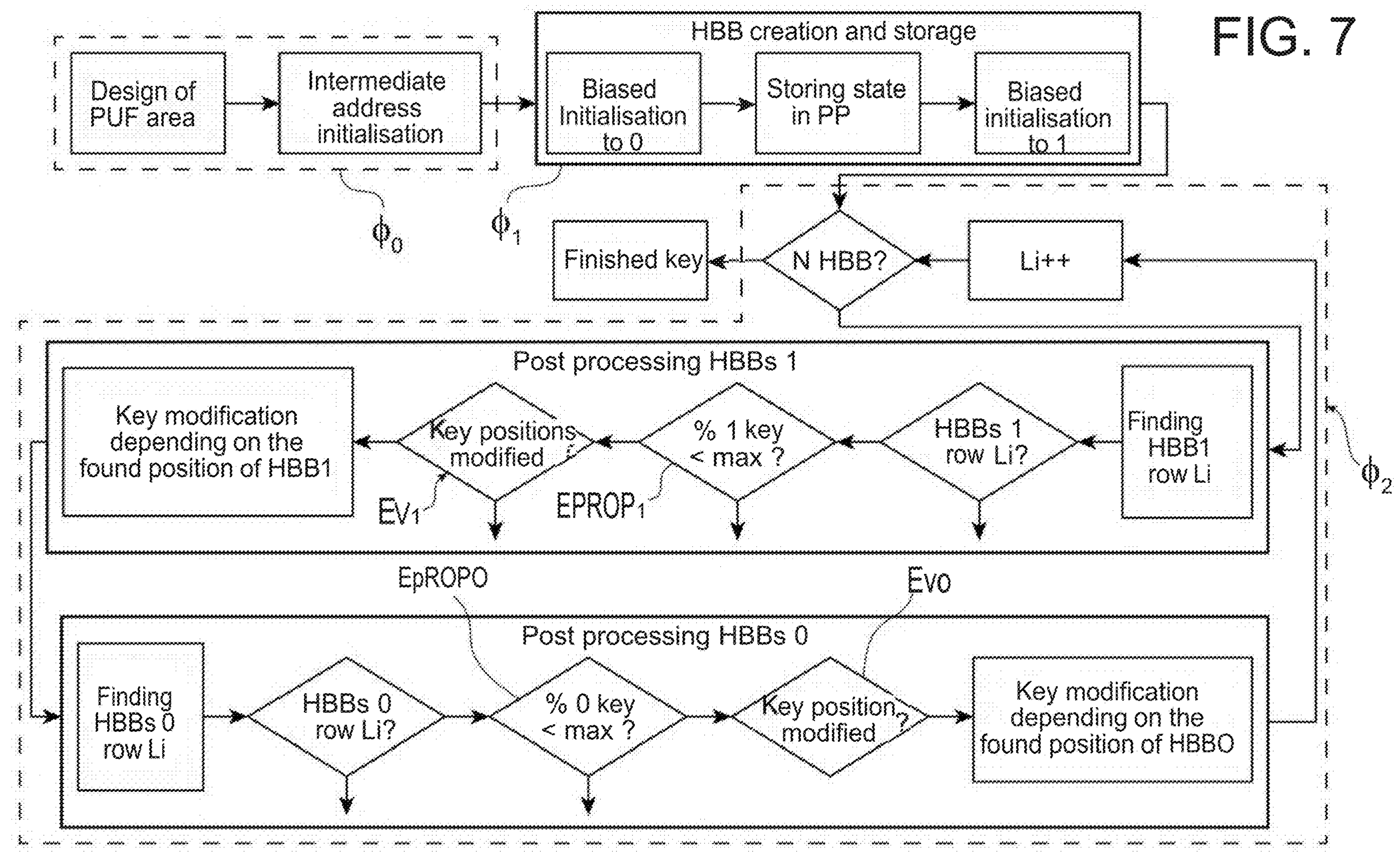
FIG. 7
Design of PUF area
Intermediate address initialisation
ϕ0
HBB creation and storage
Biased Initialisation to 0
Storing state in PP
Biased initialisation to 1
ϕ1
Finished key
N HBB?
Li++
ϕ2
Post processing HBBs 1
Key modification depending on the found position of HBB1
Key positions modified ?
% 1 key < max ?
HBBs 1 row Li?
Finding HBB1 row Li
EV1
EPROP1
EpROPO
Evo
Post processing HBBs 0
Finding HBBs 0 row Li
HBBs 0 row Li?
% 0 key < max ?
Key position modified ?
Key modification depending on the found position of HBBO

GENERATION OF A CRYPTOGRAPHIC KEY FROM AN SRAM MEMORY

TECHNICAL FIELD

The present application relates to the field of the generation of cryptographic keys from a memory.

It more specifically relates to an improved method for generating a cryptographic key from a hash digest resulting from the initialisation of an SRAM ("Static Random Access Memory") memory as well as a device using such a method.

Prior Art

It is known to use an SRAM memory as a Physical Unclonable Function or PUF in order to provide a hash digest that is not directly accessible and which is used as a unique identifier. A cryptographic key can then be constituted from this hash digest.

A known technique for generating such a hash digest likely to be used as a cryptographic key from an SRAM includes in particular a phase called enrolment phase consisting of carrying out a repeated succession of initialisations of the SRAM memory in order to be able to select memory cells, in other words bits, called "highly biased" bits.

There is a reduced number of techniques for initialising an SRAM memory. The best-known initialisation technique is an initialisation called "free" initialisation, which consists in the unconstrained ignition of a plane of memory cells. With a free initialisation, the state in which each cell is initialised is freely established. In particular, during an unconstrained ignition of a $k^{th}$ chip among a very large number $N_p$~10,000 of produced chips, the cell of the $i^{th}$ column and the $j^{th}$ row has a probability $p_{ijk}$ of being initialised at a logic level '1' and a probability $1-p_{ijk}$ of being initialised at a logic level '0'. Over a large number ~100 of unconstrained initialisations, the average of the initialisation values of the cell of the $i^{th}$ column and the $j^{th}$ row in a memory plane of the $k^{th}$ chip will tend towards this probability value $p_{ijk}$. It turns out that this probability value changes from one cell to another and between one chip and another, in a manner that on a set of cells of different chips there will be a statistic of p which depends in particular on the local variability of the manufacturing method thereof and more globally on PVT ("Process", "Voltage", "Temperature") conditions in other words on local and global variations of the manufacturing method, the slew rate $V_{SR}$ (expressed in Volt/seconds) of the supply voltage level which are used, and the operating temperature.

For a fixed k, highly biased bits correspond to cells with a high probability of switching and being initialised at a given logic level ($p_{ijk}$ equal to or very close to 1 for the cells with a high tendency to be initialised at '1'; and $p_{ijk}$ equal to or very close to 0 for the cells with a high tendency to initialise at '0').

Initialising a memory can take several cycles (100-100000 depending on the frequency of the system) and an enrolment phase can contain several memory ignitions, typically several dozen to allow ensuring a sufficient invariability of the initialisation potential value corresponding to a logic level '1' or '0' and thus allow identifying a cell, in other words a Highly Biased Bit (HBB).

The enrolment phase can thus be very long to implement and one might want to perform it only a limited number of times and advantageously only once.

Moreover, the result of the enrolment phase is typically stored in a non-volatile memory (NVM) whose security may be insufficient.

Furthermore, the known enrolment techniques sometimes require the use of an error correction code (ECC) to recover the result of the enrolment phase stored in the NVM memory and to extract the HBB bits each time a cryptographic key based on the SRAM PUF is generated. This way of doing things reduces the number of cycles required to create a key, but the absolute number of cycles can still be significant given that the decoding of the ECC code must typically be performed at each key generation request.

The use of a non-volatile memory NVM and an ECC code also have the drawback of requiring a significant memory space requirement.

The problem arises of finding a new method for generating a cryptographic key from an SRAM type memory, which is improved and in particular with regard to at least one of the drawbacks stated above.

DESCRIPTION OF THE INVENTION

It is therefore an aim of the present invention to provide a method for generating a cryptographic key from an SRAM memory, comprising steps consisting in:

- performing a first biased initialisation of a first set of cells located in at least one first region of the SRAM memory, so as to promote the establishment in a first logic state, of the cells of said first set,
- storing, in a second set of cells of a second region of the memory, the respective states of the cells of said first set and resulting from the first biased initialisation, then,
- performing a second biased initialisation of said first set of cells so as to promote a setting in a second logic state, complementary to said first logic state, of the cells of said first set,
- the method further comprising, after the first biased initialisation and the second biased initialisation:
- establishing an N-bit digital key, from one or more given positions identified in the second region respectively of one or more cells which are "highly biased to the second state" which belong to said second set and are in the second logic state following the first biased initialisation, and from one or more other positions identified in the first region respectively of one or more cells which are "highly biased to the first state" which belong to said first set and which are in said first logic state following the second biased initialisation: an N-bit digital key, the digital key being intended to form the cryptographic key or forming a digital word from which the encryption key is intended to be formed.

The first region is typically a region called "PUF" region, in other words dedicated in particular to the implementation of a physical unclonable function. The second region may be a region called "post-processing" region.

With such a method, it is possible, with a limited number of initialisation steps, here particular and "biased" initialisations, to quickly find cells (in other words bits) which are highly biased to '1' and cells or bits which are highly biased to '0' and to use the respective positions of these cells or bits to form a digital key likely to form a cryptographic key or encryption key.

With such a method, a limited memory space is also used since it is not necessary to duplicate the respective states of memory cells a significant number of times.

Such a method thus allows replacing the conventional enrolment phase with a faster and less resource-intensive phase.

Such a method also has the particularity of not necessarily requiring a non-volatile memory and the use of error correction codes.

It also allows for improvements in terms of security, since the amount of sensitive data implemented during the development of the digital key is reduced.

In the case of a possible attack, these two regions of the memory can be advantageously erased in a single clock stroke, for example by a method called "fast erase" method.

Advantageously, the first region is read-only. This can prevent a drift in behaviour in terms of initialisation of the first region during its useful life.

Advantageously, the second region is readable and writable.

The first region can be formed of m rows of memory cells, while the second region is formed of m or m+k (with m and k non-zero integers) rows of memory cells.

When the first region is formed of m rows, it can be associated with k complementary rows formed of distinct system registers of the memory.

According to a particular embodiment, the establishment of the digital key comprises steps of:

- searching in an $i^{th}$ row of the second region for at least one cell which is highly biased to the second state and when a cell which is highly biased to the second state called "first cell" is detected, identifying the position, called "first position", of the first detected cell,
- searching in an $i^{th}$ row of the first region for at least one cell which is highly biased to the second state and when a cell which is highly biased to the second state called "second cell" is detected, identifying the position, called "second position", of the second detected cell, the method further comprising,

- after identifying the first position of the first cell: modifying a given bit located at a first location of the digital key, in particular by setting said given bit in the second state, said first location of the digital key being selected depending on the first identified position, and/or,

- after identifying the second position: modifying another bit located at a second location of the digital key, in particular by setting said other bit in the first state, said second location of the digital key being selected depending on the second identified position.

Thus, a row-by-row processing is preferably performed on a reduced number of regions of the SRAM memory to lead to the construction of the key.

Advantageously, the first identified position corresponds to the $k^{th}$ rank of the $i^{th}$ row and the digital key can be formed in at least one "post-processing auxiliary" row of the SRAM memory or in a register of the previously mentioned system. The first location can then be determined in the post-processing auxiliary row depending on k, and in particular can correspond to the $k^{th}$ rank of the post-processing auxiliary row or register.

According to an advantageous embodiment, the method may further comprise:

- after searching for and identifying the first position and before modifying said given bit, a step of checking, relative to a first determined threshold, a proportion of bits in the first state in the digital key, and/or,

- after searching for and identifying the second position and before modifying said other bit, a step of checking, relative to a second determined threshold, a proportion of bits in the second state in the digital key.

Such checks can control the number of '0's and '1's in the digital key and thus adjust it depending on the application.

The digital key may advantageously be formed from a post-processing auxiliary row of the SRAM memory or even from a memory register of a system to which said memory belongs, with the erasure property described above. This memory may also be provided with one or more additional post-processing auxiliary rows, and in particular one or more rows for listing, at each modification of a bit of the digital key, a corresponding location of this modified bit in the digital key. If the memory does not include these k auxiliary rows, it is possible to carry out these operations in registers of the system to which the memory belongs.

According to one embodiment, the digital key being developed is recorded at a first memory address or a first register of the system. The digital key being developed is duplicated in the form of a second digital key at a second memory address or a second register of the system.

A key may be recorded at a memory address and duplicated in a register or conversely a key is recorded in a register and duplicated at a memory address.

A modification of a bit of the digital key can then in this case be performed simultaneously in the second digital key and the method can further comprise steps consisting in:

- checking the identity of the digital key and the second digital key and, when the digital key and the second digital key are different,
- erasing the content of the first region and the second region.

A mechanism called "fast" erasure mechanism can be used in particular. This provides an additional level of security in the case of a possible intrusion.

According to another particular embodiment, when the establishment of the N-bit digital key is performed by row-by-row processing and when all rows of the first region have already been processed without all the N-bits of the digital key having been updated or constituted, the method may further comprise, during said establishment of the N-bit digital key, additional steps consisting in:

- performing a third biased initialisation of a third set of cells of a third region, in particular dedicated to the PUF, of the SRAM memory or belonging to another SRAM memory so as to promote the establishment, in a first logic state, the cells of said third set,
- storing the respective states of the cells of said third set and resulting from the third biased initialisation, then,
- performing a biased initialisation of said third set of said third region so as to promote a setting in a second logic state, complementary to said first logic state, the cells of said third set, The digital key can then be completed from the positions of one or more cells which are "highly biased to the second state" which belong to said third set and are in the second logic state following the third biased initialisation, and from the positions of one or more cells which are "highly biased to the first state" which belong to said third set and are in said first logic state following the fourth biased initialisation.

Alternatively, the digital key may consist of N-bits whose respective values each depend on a position identified among said given positions and the other identified positions of cells which are highly biased to the first state following said second biased initialisation and of cells which are highly biased to the first state following the second biased initialisation.

According to one possible implementation of the method, the digital key is established in an "auxiliary" sub-region of the SRAM memory or in a system register and the method may further comprise, prior to the first biased initialisation and the second biased initialisation, a step of initialising the "auxiliary" sub-region or the register, so as to establish the memory cells of the "auxiliary" sub-region or the bits of the registers of the "auxiliary" sub-region all at the same given logic state, in particular a logic state '0'.

According to a particular implementation of the method, the latter may further comprise, prior to the first biased initialisation, a step of setting means for controlling the initialisation of the SRAM memory, so as to adjust the given probability of the cells of the first region to be established in a first logic state following the first biased initialisation.

This given probability may advantageously be modulated depending on a pulse duration on at least one word line coupled to access transistors of the cells of said first set of cells and applied during the first biased initialisation.

According to another aspect, the present invention provides a method for controlling an SRAM memory comprising steps of:

- powering up said SRAM memory;
- implementing a method for generating a cryptographic key as defined above,
- and, between the power-up and the implementation of the method for generating a cryptographic key or, after the implementation of said method for generating a cryptographic key:
- setting the cells of the first region and the second region in an indeterminate state called "metastable" state for which their respective first storage node and their respective second storage node are set to equal or substantially equal potentials.

It is thus possible to provide for applying a process of anti-aging or against the NBTI effect to the regions of the memory used to develop the key.

According to another aspect, the present invention relates to a device comprising:

- an SRAM memory,
- means for controlling the SRAM memory provided with at least one processor, or a digital circuit or at least one computer processing unit, configured to implement a method as defined above.

According to a particular implementation, the device can also be provided with a register file for the auxiliary calculations.

BRIEF DESCRIPTION OF THE DRAWINGS

The present invention will be better understood upon reading the description of examples of embodiment given, purely by means of indicative and non-limiting example, while referring to the appended drawings wherein:

FIG. 2 is used to illustrate an example of a sequence of steps of a method for generating a cryptographic key from cells which are highly biased to '1' and from cells which are highly biased to '0' of an SRAM memory area.

FIG. 6 is used to illustrate a method variant in which a digital key being developed is duplicated in order to check its integrity during this development.

FIG. 7 is used to illustrate a method variant in which the proportion of '1' or '0' in a digital key developed from a region called PUF region of an SRAM memory is adjusted.

Identical, similar or equivalent parts of the various figures bear the same numerical references so as to facilitate passing from one figure to another.

The various parts shown on the figures are not necessarily shown to a uniform scale, to make the figures more legible.

DETAILED DESCRIPTION OF PARTICULAR EMBODIMENTS

Figure 1:
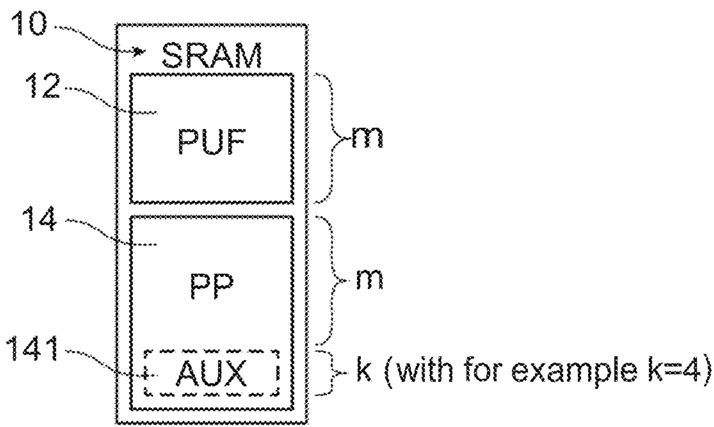
FIG. 1 is used to illustrate an example of an arrangement of an SRAM memory area from which a method for generating a cryptographic key and as implemented according to the invention can be carried out.

An example of a method according to the present invention to allow generating a cryptographic key uses an SRAM memory typically provided with a memory area 10 divided into at least two regions as schematically illustrated in FIG. 1.

A first region 12 of the area 10 is provided here with m rows (in other words m horizontal rows, with m a non-zero integer), of memory cells. This first region 12 called "PUF" is preferably made read-only and contains a physical unclonable function.

A second region 14 of the area 10 called post-processing (PP), made both readable and writable, is here provided with a size and a number of rows m+k (with k a non-zero integer) which are greater than those of the first region 12 insofar as, during the method implemented to allow the cryptographic key to be generated, the second region 14 is intended to store a copy of the respective states of memory cells of the first region 12. The second region 14 is not exclusively dedicated to the generation of a cryptographic key and can, outside of the processing described here to generate such a key, be used for the implementation of other secure calculations.

Typically, the second region 14 is provided to be slightly larger than the first region 12, with a number of k additional rows comprised for example between 4 and 6. The k additional rows of the second region 14 can form a sub-region 141 called "auxiliary" sub-region dedicated to the implementation of calculations during the establishment of the cryptographic key.

The flowchart of FIG. 2 schematically gives a possible succession of phases and steps implemented to be able to result in obtaining (final step $E_{FIN}$) a digital key for example in the form of an N-bit word intended to form the cryptographic key or from which the cryptographic key is likely to be formed.

The generation of the cryptographic key here has the particularity of including a phase $\phi_1$ called phase "of implementing highly biased bits HBB". This phase $\phi$1 here includes a reduced number of processing steps and in particular a reduced number of initialisations.

During this phase $\phi_1$ a first particular initialisation step $E_{IC0}$ is first carried out, called "biased" initialisation of the cells belonging to the first region 12 of the SRAM memory area 10. This first biased initialisation is here performed so as to promote the setting of the cells of the first region 12 in a first given logic state.

the term "promoting" means here that action is taken, by means for controlling the SRAM memory, on the probability of each cell, of being established at a given logic state rather than at a complementary logic state following an initialisation and this, without imposing this given logic state and thus setting all cells at this given logic state during this initialisation. Such control means allow adjusting the probability of establishing the cells at a given state of the cells so that their probability of initialisation at this given state, for example '0', is greater than at a complementary logic state, for example '1', of this given state.

When a biased initialisation is implemented, efforts are made to make a large majority of the initialised cells established at a given logic state. However, some cells are established at the complementary logic state of the given logic state despite the introduced initialisation bias. These cells are here called "highly biased" cells.

Examples of control means allow implementing a biased initialisation of SRAM memory cells are given in the application FR 3128570 A1 from the applicant. A circuit allowing performing a biased initialisation is described in this application FR 3128570 A1 in particular in connection with FIG. 6 of this application FR 3128570 A1. In order to control the initialisation statistics and modulate the probability of establishing the cells in a given logic state, action is taken here in particular on their polarisation during the initialisation and in particular the voltage values applied to the bit lines.

In order to allow biasing the initialisation state of a given memory cell, another example of control means is based on adjusting a write time, in particular by modulating the duration $T_{pulse}$ of a pulse applied to activate a word line WL associated with a row of cells to which this given memory cell belongs.

Figure 3:
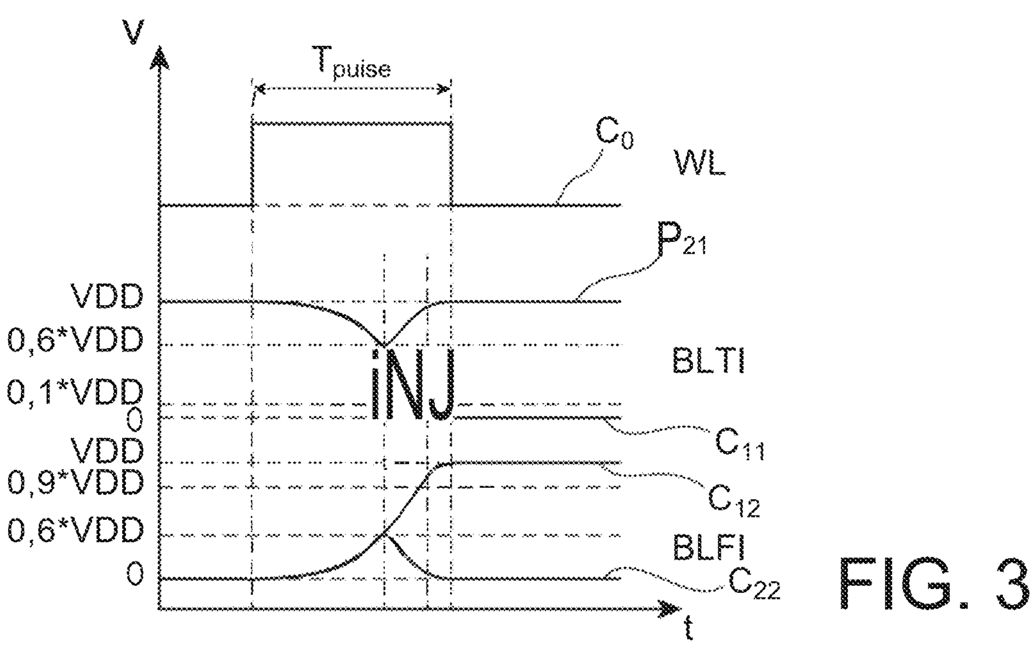
FIG. 3 is used to illustrate an example of a method for modulating a probability of initialisation to '1' or '0' of memory cells of a region of SRAM memory and being able to carry out a biased initialisation of the cells of the memory promoting a given logic initialisation state.

As illustrated schematically in FIG. 3, if it is desired to perform a write to a given logic state in a cell, for example at '0' and impose a logic state '0' thereon in this case, a pulse duration $T_{pulse}$ which is sufficient and greater than a first threshold is allowed so that the bit lines BLTi, BLFi can be established at respective predetermined levels, for example 0.9 VDD for a first bit line and 0.1 VDD for the complementary bit line BLFi.

In the case that interests us, it is desired to perform a biased initialisation (promote a logic state '0' with a given probability rather than imposing it). However, when the pulse duration $T_{pulse}$ is sufficient and greater than a second threshold, but less than the first threshold, this cell can be initialised either to a logic state '0' or to a state '1', with all the same a probability of being established at the state '0' which is greater than that of being established at the state '1' and typically comprised between 95 and 99% and advantageously between 98 and 99%.

In such a case, if following a biased initialisation at 0, the logic state imposed on the cell is indeed '0', this means that the cell does not correspond to a highly biased cell. It thus follows the inertia of the input pulses (curves $C_{11}$ and $C_{12}$) imposed on the first bit line BLTi and second bit line BLFi.

However, if following a biased initialisation to 0, the logic state of the cell still switches to a logic state '1' (curves $C_{21}$ and $C_{22}$) despite the higher probability of switching to 0, the cell (and its corresponding bit) is then identifiable as highly biased to 1.

According to one possible embodiment, as illustrated in FIG. 2, the first step of biased initialisation of the cells of the first region 12 can be for example a biased initialisation to '0' (step $E_{IC0}$), in other words performed so as to promote a setting of the cells of the first region 12 in a logic state '0'.

The respective state of the cells of the first region 12 resulting from the first biased initialisation is then stored (step $E_{STO}$) in the second region 14 of the SRAM memory area 10. The respective states of the cells of the first region 12 are thus duplicated in the second region 14.

Then (step $E_{IC1}$), a second biased initialisation is performed, this time to the second state of the (same) cells of the first region 12 of the memory. Then the establishment of the cells of the first region 12 in a second state complementary to the first state is thus promoted.

Thus, if the example illustrated in FIG. 2 is followed, where we have previously performed a first biased initialisation to '0' of the cells of the first region 12, the second biased initialisation is this time a biased initialisation to '1' (step $E_{IC1}$). In other words, an initialisation of these cells of the first region 12 is performed so as to promote a setting to a logic state '1' of the cells of the first region 12.

At the end of these steps $E_{IC0}$ and $E_{IC1}$, there is available in the memory zone 10 in the first region 12, a set of cells whose state results from the second biased initialisation (step $E_{IC1}$), here an initialisation biased to '1', and in the second region 14, a set of cells whose state results from the first biased initialisation (step $E_{IC0}$), here an initialisation biased to '0'.

Cells (in other words bits) which are highly biased in the first state and in the second region 14, cells (in other words bits) highly biased to the second state are thus found in the first region 12.

If the particular exemplary embodiment of the method illustrated in FIG. 2 is followed, in the second region 14, certain cells denoted "HBB1" were found, and which, despite the first initialisation biased to '0' (step $E_{IC0}$) and a higher probability of being initialised to '0', have been established at a logic state '1'.

In the first region 12, certain cells denoted "HBB0" were also found and which, despite the second initialisation biased to '1' (step $E_{IC1}$) and a higher probability of being initialised to '1', have been established at a logic state '0'.

The phase $\phi$1 of finding highly biased cells (in other words bits) replaces a conventional enrolment phase and as implemented in the methods according to the prior art for generating a cryptographic key from an SRAM memory and in particular from a PUF region of this memory.

It has the advantage in particular of including a reduced number of steps ($E_{IC0}$, $E_{STO}$ and $E_{IC1}$) which is much lower than a conventional enrolment phase and according to a sequence that does not necessarily need to be repeated. This allows achieving a considerable gain in terms of consumption, necessary resources (whether from the point of view of processing time and the sizes of allocated memory areas) and data security.

Once the biased initialisation sequence and the phase $\phi_1$ of finding the highly biased bits have been completed, a phase $\phi_2$ called "post-processing" phase is carried out, where a digital key intended to form the encryption key or from which the encryption key is capable of being formed is iteratively constructed.

The establishment of such a digital key comprises steps of searching, in the second region 14, for the highly biased bits in the first state and identifying their respective positions, and of searching, in the first region 12, for the highly biased bits in the second state and of identifying their respective positionings.

Thus, referring to the example of an initialisation sequence given above with a biased initialisation to '0' followed by a biased initialisation to '1', during the post-processing phase $\phi_2$, the digital key is established from the positions of bits "HBB1" (in other words cells) which are highly biased to '1' in the second region 14 and from positions of bits "HBB0" (in other words cells) which are highly biased to '0' in the first region 12.

Figure 4:
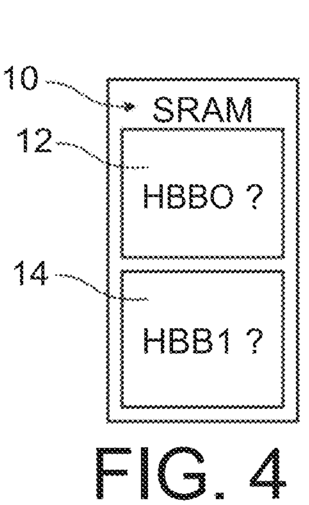
FIG. 4 is used to illustrate a search for bits highly biased to '0' and bits highly biased to '1' respectively in a first region, in particular dedicated to the PUF, of a SRAM memory having previously been the subject of a biased initialisation to '1' and in a second region, in particular a post-processing region, of an SRAM memory containing cells whose state results from a biased initialisation to '0'.
Figure 5:
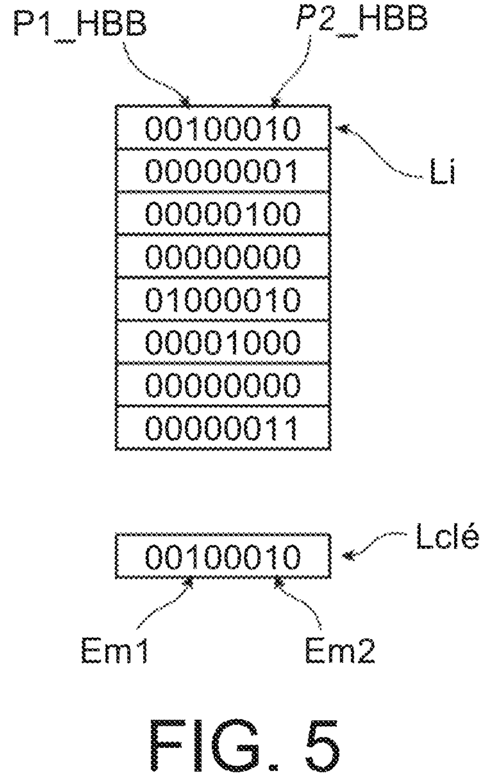
FIG. 5 is used to illustrate a modification of a particular memory row or of a register of the system, intended to form a digital key depending on the positioning of highly biased bits identified in the first region or in the second region.

Such a search in the regions 12 and 14 of the memory area 10 is schematically shown in FIG. 4.

For example, it can be provided that the detection of the presence of a highly biased cell in an $i^{th}$ row (in other words "horizontal row") of the first region 12 or of the second region 14 and located at a $k^{th}$ position in this $i^{th}$ row (i.e. the $k^{th}$ column or vertical row) can lead to a modification of a bit located at a location, in particular located at a $k^{th}$ position of at least one "post-processing" auxiliary memory row Lkey from which the digital key is formed. This memory row Lkey is in particular a memory row of the auxiliary sub-region 141, dedicated to the post-processing calculations.

Thus, in a particular exemplary embodiment illustrated in FIG. 2, when highly biased bits HBB are detected in an $i^{th}$ row Li in the region 12 or the region 14, and their positions P1_HBB. P2_HBB (i.e. a horizontal row) are identified, a modification of bits in the digital key can then be performed at corresponding locations Em1, Em2, in terms of positioning or rank in this digital key. In the particular exemplary embodiment illustrated when bits highly biased to '1' are detected respectively in the $3^{rd}$ column (or rank) and in the $7^{th}$ column (or rank), the bits of the $3^{rd}$ rank (or column) and the $7^{th}$ (rank or column) of the row Lkey forming the digital key are modified (here a '1' is written).

Typically, the post-processing phase $\phi_2$ comprises a repeated processing, row by row, comprising steps consisting in:

a) searching for at least one cell which is highly biased to the state '1' in an $i^{th}$ row of the second region 14 and, if applicable, identifying the position called "first position" of this cell in the $i^{th}$ row of the second region 14, b) searching for at least one cell which is highly biased to the state '0' in an $i^{th}$ row of the first region 12 and, if applicable, identifying the position called "second position" of this cell which is highly biased to the state '0' in this $i^{th}$ row of the first region 12.

Step a) may be followed, when a cell which is highly biased to the state '1' has been detected, by a step consisting in updating or modifying, in particular setting to the state '1', a bit of the digital key located at a first location. This first location in the digital key depends on that of the first position identified in the $i^{th}$ row. Thus, if the cell which is highly biased to the state '1' is in the $k^{th}$ position or located at a $k^{th}$ rank of the $i^{th}$ row, the bit likely to be modified is determined according to this $k^{th}$ position and can in particular be placed at the $k^{th}$ rank of the digital key or of the post-processing auxiliary row Lkey in which this digital key is formed.

The possible modification of the first location can be conditioned by the fact that this first location has not already been modified during the processing of a previous row $L_{i-1}$ or i−1th row.

Thus, prior to a possible step of modifying the first location, the method can comprise a step of checking whether the first location of the digital key has already been modified previously. When no prior modification has been implemented, the modification or update of the bit at the first location can then be performed. In order to perform such a check, the auxiliary sub-region 141 may for example be provided with one or more specific post-processing auxiliary rows to list each location of bits which are already modified in the digital key.

Similarly, step b) may be followed, when the second highly biased cell has been detected, by a step consisting in modifying, in particular setting in the first state, at least one second bit of the digital key at a second location in the memory row $L_i$ or $i^{th}$ row.

The possible modification of the second location may be conditioned by the fact that this second location has not already been modified during the processing of a previous row $L_{i-1}$ or i−1th row.

Thus, prior to a possible step of modifying the second location, the method may comprise a verification step to determine whether the second location in the digital key has been modified previously. When no prior modification has been implemented, the modification of the second location may then be performed.

Referring to the particular example of the method illustrated in

FIG. 2, the phase $\phi_2$ called "post-processing" itself contains a sequence of two sub-phases φpp1, φpp0 to process an $i^{th}$ row, this sequence being repeated for as many rows as are necessary to form the key.

During a first sub-phase $\varphi_{PP1}$, called phase of post-processing of bits biased to 1, the possible presence of bits HBB1 highly biased to '1' on the $i^{th}$ row Li of the first region 12 is first detected (step $E_{D1}$) and, if necessary, their respective positions are identified.

It is then checked (step $E_{v1}$) whether locations corresponding to these respective positions in the digital key have already been modified. If this is not the case, a modification (step $E_{mod1}$) of the digital key is carried out at said corresponding locations by writing the value of the highly biased bits, here typically a logical value of '1' for HBB1 bits highly biased to '1'.

Otherwise, if the corresponding locations of the digital key have already been modified, no modification of the digital key is made and we move on to the second sub-phase $\varphi_{PP0}$.

In a case where, during the first sub-phase φPP1, no HBB1 bit highly biased to '1' is detected on the $i^{th}$ row Li, we also move on to the second sub-phase $\varphi_{PP0}$.

During the second sub-phase $\varphi_{PP0}$, called post-processing of bits biased to '0', firstly, the possible presence of HBB0 bits highly biased to '0' on the $i^{th}$ row $L_i$ of the second region 14 is detected (step $E_{D0}$).

If there are one or more HBB0 bits, in other words, highly biased to '0', their respective positions are identified then it is checked (step $E_{v0}$) whether the corresponding locations in the digital key have already been modified.

If this is not the case, a modification (step $E_{mod0}$) of the digital key is carried out at said corresponding locations by writing the value of the highly biased bits, here typically a logical value of '0' for HBB0 bits highly biased to 0.

Then one move to the next row $L_{i-1}$ (step Li++) In a case where, during the second sub-phase $\varphi_{PP0}$, no HBB0 bit, in other words, highly biased to '0' is detected on the $i^{th}$ row $L_i$, one also moves to the next row $L_{i+1}$ (step $L_i$++).

The same procedure is repeated row by row.

The digital key which is iteratively constituted can be formed of N-bits. The repetition of the sequence of the two sub-phases $\varphi_{PP1}$, $\varphi_{PP0}$ can be stopped as soon as we have completed and written at least once, in each of the N bits constituting the cryptographic key.

The digital key that has been iteratively constituted may be intended to be directly used as a cryptographic key or even used as a basis for generating a cryptographic key, possibly with a different number of bits, after having undergone one or more processings, in particular one or more logical operations.

The number m of rows of the first region 12 is here preferably sized by design to allow, even in extreme cases of memory aging and high temperatures, that at least N highly biased bits are available at the end of the phase $\phi_1$ of finding the highly biased bits.

However, the method of implementing the cryptographic key may be completed and the cryptographic key may be determined at the end of a number of repetitions of the sequence of the two sub-phases $\varphi_{PP1}$, $\varphi_{PP0}$ less than m, the calculations in the $m/2^{nd}$ row or before if the operating conditions are more optimal than expected.

In the previously described exemplary embodiment in connection with FIG. 2, bits (or cells) which are highly biased to '0' are highlighted in the first region 12 and bits (or cells) which are highly biased to '1' are found in the second region 14.

Alternatively, to the first phase $\phi_1$ of finding the highly biased bits, it is however possible to first perform the biased initialisation to '1' of the first region 12 (step $E_{IC1}$), then duplicate the initialisation values in the second region 14 (step $E_{STO}$), then perform the biased initialisation to '0' (step $E_{IC0}$) in the first region 12.

In this case, bits (or cells) which are highly biased to '1' are then detected in the first region 12 and bits (or cells) which are highly biased to '0' are detected in the second region 14 during the post-processing phase $\phi_2$.

Similarly, the order of the steps or sub-phases $\varphi_{pp1}$, $\varphi_{PP0}$ during the post-processing phase $\phi_2$ can also be reversed relative to that described previously in connection with FIG. 2.

Thus, it is possible to first perform the sub-phase $\varphi_{PP0}$ to process an $i^{th}$ row of the region 12 or 14 containing the bits highly biased to '0' in order to identify the positioning of the bits highly biased to '0' and modify accordingly a dedicated location of the digital key depending on this positioning, then perform the sub-phase $\varphi_{PP1}$ to process an $i^{th}$ row of the other region 14 or 12 containing the bits highly biased to '1' in order to identify the positioning of the bits highly biased to '1' in this $i^{th}$ row and modify accordingly, typically by writing a '1' at another location dedicated to the digital key according to this positioning.

Even if, as previously described, a reverse order of certain steps of phases $\phi_1$, $\phi_2$ can be provided, the same order of steps is however preferably kept throughout the service life or use of the SRAM memory, in order to be able to generate the same cryptographic key each time.

During the previously described post-processing phase $\phi_2$, the steps consisting in identifying the heavily biased bits can be carried out for example using a series of logical operations such as elementary logical operations OR, AND and XOR.

According to a particular embodiment, the steps of biased initialisation in the first state and biased initialisation in the second state can be set, such that the probability of initialisation, in the second state, of cells having been initialised by initialisation biased to the first state, is different from the probability of initialisation, in the first state, of the same cells having been initialised by initialisation biased to the second state.

Thus, it is possible to respectively set the biased initialisation to '1' (step $E_{CO1}$) and the biased initialisation to '0' (step $E_{CO0}$) so that, following the initialisation biased to '1', the probability of finding bits highly biased to '0' HBB0 is different from the probability, following the initialisation biased to '0' of finding bits highly biased to '1' HBB1. By doing this, it is possible to thus modulate the percentage of '0' and '1' that will be found in the cryptographic key. This allows diversifying the response that the same area PUF can give.

During the post-processing phase $\phi_2$, it is possible to use and perform operations on other rows (or bits or locations) than Lkey (intended to form the cryptographic key itself).

Thus, for example, a second row of the auxiliary sub-region 141 may be provided for example to allow a tracking of already modified bits of the first auxiliary post-processing row during the post-processing phase $\phi_2$ following a detection of a bit highly biased to '0'. A third row of the auxiliary sub-region 141 may be provided for example to allow a tracking of already modified bits of the first post-processing auxiliary row during the post-processing phase $\phi_2$ following a detection of a bit highly biased to '1'. An additional row may be used in turn to perform a masked writing in the auxiliary post-processing row(s) Lkey forming the digital key.

A method as previously described may comprise, prior to the phase $\phi_1$ of finding the HBBs, a phase $\phi_0$ of the additional steps in particular of defining certain parameters prior to those of biased initialisations of the memory area 10.

Thus, in the exemplary embodiment illustrated in FIG. 2, prior to the first phase $\phi_1$, the method comprises a phase $\phi_0$ during which a step $E_{CAL}$ of designing the first region 12 containing a physical unclonable function.

Such a step may comprise in particular the setting of the initialisation conditions of this first region 12 and in particular the initialisation control means associated with this first region 12 in order to define the probability of establishing the cells of the first region 12 to '0' or '1' and/or a specific percentage of bits highly biased to '0' or '1'.

The parameters regulating the biased initialisation conditions of the first region 12 may be adapted depending on the technological node used to manufacture the SRAM memory and an estimation of its service life, and by using an abacus linked to the physical characteristics of the circuit, in particular of aging and operating temperature.

Such a design may also comprise a step of dimensioning the first region 12 aimed in particular at determining the number m of useful rows for this first region 12.

The phase $\phi_0$ of the method may also comprise an $E_{IADR}$ step of initialising intermediate addresses, and in particular of initialising the second region 14 or at least the post-processing auxiliary sub-region 141. The memory cells of this "auxiliary" sub-region 141 are then established by imposing thereon all the same given logic state, in particular a logic state '0'.

According to an improved security variant, provision may be made to duplicate the digital key intended to form the cryptographic key or from which the cryptographic key is intended to be formed at another address and thus provide for establishing a second digital key in parallel. This second key is intended, just like the first key, to be formed incrementally, for example in a manner as previously described. The digital key and the second key are preferably modified simultaneously following the detection of a highly biased bit.

In this case, it is also possible to provide, before a possible step of modifying the digital key and the second key following the detection of a highly biased bit, a step of checking the identity of the digital key and of the second key. In the case where, following this checking step, a difference between these two keys is detected, it is then possible to proceed with erasing the memory area 10 in order to erase the content of the cells of the first region 12 and of the second region 14.

Such erasure can in particular be implemented by a fast erasure technique as described for example in document EP 3°496°101 and in which, in particular, their access transistors are turned on and the bit lines BLT and BLF with which they are associated are connected to each other.

Thus, in the particular embodiment illustrated in FIG. 6, in addition to steps similar to those of the exemplary embodiment illustrated in FIG. 2, additional steps $E_{VER1}$ and $E_{VER2}$ of checking the identity between the two keys are provided. A first checking step $E_{VER1}$ of the identity of the digital keys key1 and key2 is implemented in particular after detection of a bit highly biased to '1' and its position and before a possible modification of the first and second keys following this detection. A second checking step $E_{VER2}$ of the identity of the digital keys key1 and key2 may also be implemented in particular after detection of a bit highly biased to '0' and its position and before a possible modification of the first and second keys resulting from this detection.

In a case where a difference is detected between the two keys key1 and key2, a step $E_{eff}$ of erasing the memory area is triggered. Otherwise, where the digital keys key1 and key2 are indeed identical, the sequence is continued in a manner as previously described.

In either of the previously described exemplary embodiments, when the percentage of bits HBB0 highly biased to '0' and when the percentage of bits highly biased to '1' HBB1 is similar, it is most of the time ended up with the generation of a key in which there is 50% of '0' and 50% of '1'.

However, it may be desired to move away from this parity. For certain applications, it is also possible to wish to have several different keys extracted from the same SRAM memory area 10 and in particular from the PUF region 12.

For this, an embodiment variant of the method integrates at least one step of comparing a proportion of '1' or '0' in the digital key being developed with a predetermined threshold.

Thus, in the exemplary embodiment illustrated in FIG. 7, after the step $E_{D1}$ of searching for cell(s) highly biased to '1' on the $i^{th}$ row $L_i$ and of identifying the position of this or these cell(s) and prior to a possible modification of at least one bit of the digital key, a step $E_{PROP1}$ of checking the proportion of '1' in the digital key being developed is provided. This checking step $E_{PROP1}$ typically comprises the comparison of this proportion with a threshold max1. When this threshold max1 is exceeded, one moves to the second sub-phase $\phi_{PP0}$. However, as long as this threshold max1 is not exceeded, the digital key is likely to be modified by setting bits at the logical value '1' here.

Similarly, after the step $E_{D1}$ of searching for cell(s) which are highly biased to '0' on the $i^{th}$ row $L_i$ and identifying the position of this or these cell(s) and prior to a possible modification of another bit of the digital key, a step $E_{PROP0}$ of checking the proportion of '0' in the digital key being developed is provided. This checking step $E_{PROP0}$ typically comprises the comparison of this proportion to a max0 threshold. When this max0 threshold is exceeded, one moves to a next row. However, as long as this max0 threshold is not exceeded, the digital key is likely to be modified by setting bits at the logical value '0' here.

Figure 9:
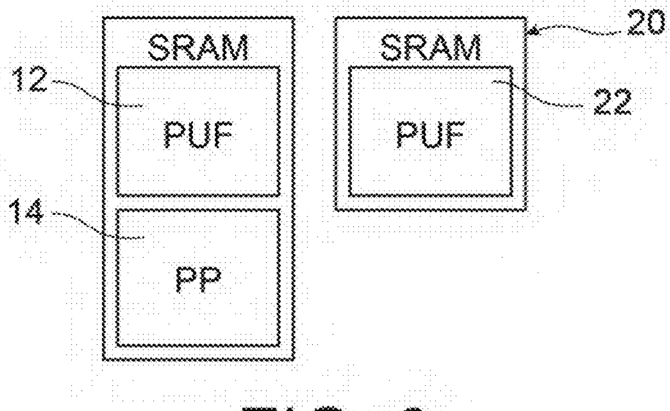
FIG. 9 is used to illustrate an additional memory region intended to form a PUF region and used in the possible case of an insufficiency of heavily biased bits in the main PUF region.

When the first SRAM region 12 available has an insufficient size due to its initial design, it may happen that this region 12 does not allow the entirety of N-bits of the digital key to be established. Thus, it is possible to encounter a case in which there are fewer than N HBB cells required to form the N-bit digital key. It may also happen that some identified HBB cells are in identical positions in terms of column or rank so that the number of HBB bits likely to be able to cause a modification of the key always remains insufficient. In this case, instead of a single SRAM memory partition or a single memory, it may be desired to have an additional partition. Thus, according to a variant illustrated in FIG. 9, a third region 22 here belonging here to an SRAM memory 20 can be used as a backup. This third region 22 is also typically dedicated to performing a physical unclonable function (PUF).

Thus, when the establishment of the N-bit digital key is performed by row-by-row processing and all rows of the first region 12 have already been processed without all N-bits of the digital key having been updated or constituted, the method may further comprise, during said establishment of the N-bit digital key, additional steps consisting in:

- performing a new biased initialisation of the set of cells of the third region 22 so as to promote the establishment in a first logic state of the cells of the third region 22,
- storing, in particular in the second region 14, the respective states of the cells of the third region 22 and resulting from the new biased initialisation, then,
- performing another new biased initialisation of the third region 22 and so as to promote a setting of the cells of the third region 22 in a second logic state, complementary to said first logic state.

The digital key is then completed from the positions of the cells which are highly biased to the second state and highly biased to the first state which are identified and which result from these new biased initialisations.

Figure 8:
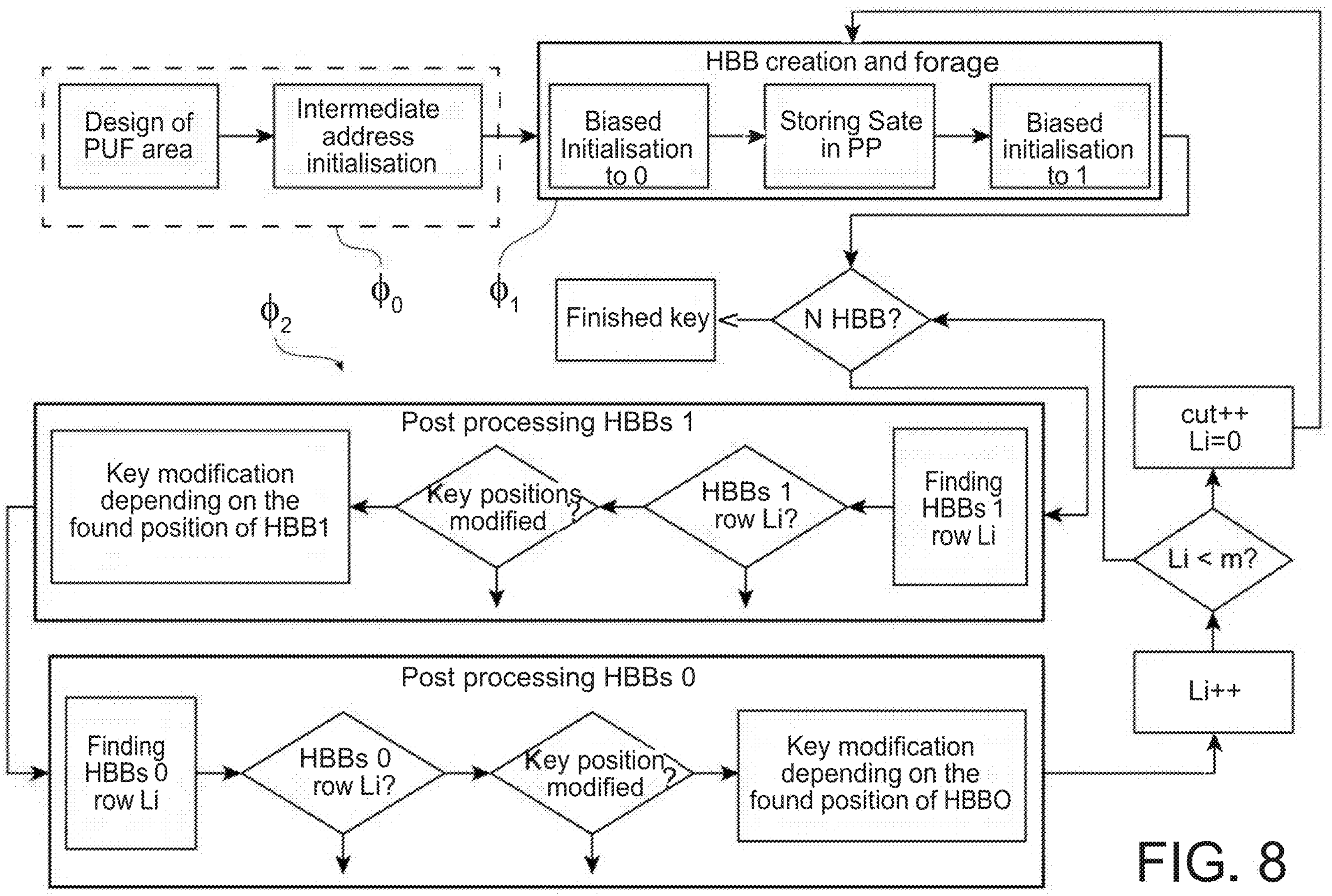
FIG. 8 is used to illustrate a method variant in which, when the PUF region used to constitute a digital key does not contain enough heavily biased bits, another memory region is selected in which a succession of biased initialisations to '0' and biased initialisations to '1' are performed.

Thus, in the particular example of the method illustrated in FIG. 8, a step consisting in comparing the number of rows already processed with the total number m of the first region 12 is provided. When this number is reached, one move to the third region 22. A biased initialisation to '0' and a biased initialisation to '1' are performed to find the highly biased cells or bits in this third region 22. A sequence as previously described is thus repeated.

In a particular case where it is desired to form an N-bit key, with N greater than the size of each memory row, in other words greater than the number of columns of the SRAM memory, it is possible, for example, to repeat the same procedure several times and in particular a procedure of the type of that described above in order to be able to generate each time a sub-word constituting the key.

After powering up the SRAM memory and during operating phases of the SRAM memory other than the one(s) where a cryptographic key is generated, it is advantageous to provide for placing at least the memory cells of the first region 12 in a particular operating state called "metastable", in order to prevent aging. Those of the second region 14 of the SRAM can possibly be placed in a metastable state to prevent the attack by remanence of the states.

Figure 10:
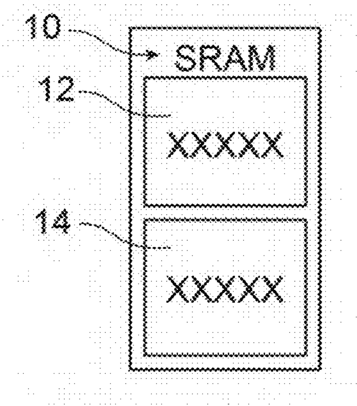
FIG. 10 is used to illustrate a setting in a particular state called "metastable" state of the bits of a memory.

FIG. 10 is used to schematically illustrate such an operating mode, triggered after the memory is powered up, in particular in order to be protected against harmful effects related to NBTI ("Negative-Bias Temperature Instability"). By placing the cells dedicated to the PUFs in a metastable state, a drift in their respective initialisation states is thus avoided, thus avoiding distorting the value of the cryptographic key.

A method for placing the cells of the first region 12 and 14 in the metastable state as described in the application FR No. 2214117 filed on 21 Dec. 2022 with the INPI and can be used for example.

Placing the cells of the first region 12 and the second region 14 in a metastable state can thus consist in setting them in an indeterminate state for which their respective first storage node and second storage node are at equal or substantially equal potentials, for example by connecting the bit lines to each other or by connecting the complementary storage nodes of each cell to each other.

While the regions 12 and 14 are set in the metastable state, other cells of the SRAM memory belonging to a distinct part of the area 10 and in particular the first and second regions 12 and 14 can be at the same time placed in a determined state for which their respective first node and second node are at different respective potentials between a low state, corresponding in particular to a given logic state '0', and a high state, corresponding to a complementary logic state '1'.

Steps of a method as previously described can be implemented in several manners. A "hardware" type implementation provides that the sequence of steps is carried out using a state machine (FSM for "Finite State Machine") coded in at least one electronic circuit and/or a processor possibly located on the same chip support as the SRAM memory. Such a type of implementation is more secure and optimised in terms of execution time and energy consumption.

It is also possible to carry out the method using a "software" type implementation in which an external program, housed in a remote device (computer, processor . . . ) sends instruction by instruction to the SRAM memory to carry out the different steps. Such an embodiment offers more flexibility for setting the different steps and/or making modifications but typically has an execution time that can be longer.

Similarly, input parameters of the method such as, for example, the parameters that allow adjusting the initialisation probabilities to '1' or '0' by biased initialisation, the division of these regions can be in the form of data stored in configuration registers.

It is also possible to integrate these parameters in the form of instructions. When a processor or a computer or computer or digital processing means send(s) the controlled initialisation instructions, it(they) then add one or more information fields containing for example a value that sets the biased initialisation to '0' and the biased initialisation to '1'. The hardware and software implementations are combinable. For example, it is thus possible to implement a state machine triggered by an instruction that sends all the characterisation parameters of the biased initialisation or a program that is triggered by a configuration register and that would also contain the parameters of the biased initialisations.

Alternatively to one or other of the previously described exemplary embodiments, it is possible to provide a second region of size m associated with one or more registers external to the memory and in which the calculations and/or operations for implementing the key are implemented. In this case, such registers are preferably also protected by a mechanism of the "fast erase" type.

A method according to one or other of the previously described embodiments is particularly suitable for the fast encryption of electronic systems and can allow replacing in such systems a TNRG ("true random number generator") type module to create one or more encryption keys used by an AES (for "Advanced Encryption Standard") type module or using another encryption algorithm.

The invention claimed is:

1. A method for generating a cryptographic key from a Static Random Access Memory (SRAM), comprising:

performing a first biased initialisation of a first set of cells located in at least one first region of said SRAM that is a region dedicated to carrying out a physical unclonable function (PUF), and establishing a first logic state, of the cells of said first set:

storing in a second set of cells of a second region of said SRAM, the respective states of the cells of said first set and resulting from said first biased initialisation;

performing a second biased initialisation of said first set of cells and establishing a setting in a second logic state, complementary to said first logic state, of said cells of said first set; and after the first biased initialisation and the second biased initialisation, establishing an N-bit digital key, from one or more given positions identified in said second region respectively of one or more highly biased to second state cells which belong to said second set and are in the second logic state following said first biased initialisation, and from one or more other positions identified in said first region respectively of one or more highly biased to first state cells which belong to said first set and which are in said first logic state following said second biased initialisation, said digital key forming the cryptographic key or forming a digital word from which an encryption key is formed.

2. The method according to claim 1, wherein establishing the digital key comprises:

searching in an ith row of the second region for at least one cell which is highly biased to the second state and when a cell which is highly biased to the second state called "first cell" is detected, identifying the position, called "first position", of said first detected cell; and searching in an ith row of the first region for at least one cell which is highly biased to the second state and when a cell which is highly biased to the second state called "second cell" is detected, identifying the position, called "second position", of said second detected cell;

the method further comprising, after identifying the first position of the first cell, modifying a given bit located at a first location of the digital key, by setting said given bit in the second state, said first location of the digital key being selected depending on said first identified position;

and/or, after identifying the second position, modifying another bit located at a second location of the digital key, by setting said other bit in the first state, said second location of the digital key being selected depending on said second identified position.

3. The method according to claim 2, wherein said first identified position corresponds to a kth rank of the ith row and wherein the digital key is formed in a post-processing auxiliary row of the SRAM, said first location being determined in the post-processing auxiliary row depending on k, and corresponds to a kth rank of said post-processing auxiliary row.

4. The method according to claim 2, further comprising, after searching for and identifying said first position and before modifying said given bit, a step of checking relative to a first determined threshold a proportion of bits in the first state in the digital key and/or, after searching for and identifying said second position and before modifying said other bit, a step of checking relative to a second determined threshold a proportion of bits in the second state in the digital key.

5. The method according to claim 2, wherein the digital key consists of N-bits which respective values each depend on a position identified among said given positions and said other identified positions of cells which are highly biased to the first state following said second biased initialisation and of cells which are highly biased to the first state following said second biased initialisation.

6. The method according to claim 1, wherein the digital key is formed from a post-processing auxiliary row of the SRAM or in at least one register of an auxiliary register file, the SRAM being provided with one or more additional post-processing auxiliary rows or one or more additional auxiliary registers for listing, at each modification of a bit of the digital key, a corresponding location of the modified bit in the digital key.

7. The method according to claim 1, wherein said digital key is recorded at a first memory address or in a first register of a system, external to the SRAM, and is duplicated in the form of a second digital key at a second memory address or in a second register of the system, external to the SRAM, and wherein a modification of a bit of the digital key is performed simultaneously in the second digital key, the method further comprising:

checking the identity of the digital key and the second digital key and, when the digital key and the second digital key are different, erasing the content of the first region and the second region.

8. The method according to claim 1, wherein the establishment of the N-bit digital key is performed by row-by-row processing and wherein when all rows of the first region have already been processed without all the N-bits of the digital key having been updated or constituted, the method further comprises, during said establishment of the N-bit digital key:

performing a third biased initialisation of a third set of cells of a third region belonging to said SRAM or to another SRAM and establishing a first logic state, said cells of said third set of said third region, storing the respective states of the cells of said third set and resulting from said third biased initialisation, performing a biased initialisation of said third set of said third region and establishing a setting in a second logic state, complementary to said first logic state, said cells of said third set, and completing the digital key established from the positions of one or more highly biased to the second state cells which belong to said third set and are in the second logic state following said third biased initialisation, and from the positions of one or more highly biased to the first state cells which belong to said third set and are in said first logic state following a fourth biased initialisation.

9. The method according to claim 1, wherein the digital key is established in an auxiliary sub-region of the SRAM, the method further comprising, prior to the first biased initialisation and the second biased initialisation, at least one step of initialising the auxiliary sub-region, and establishing memory cells or bits of registers of the auxiliary sub-region all at the same given logic state, in particular a ‘0’ logic state.

10. The method according to claim 1, wherein said first region of the SRAM is read-only memory, said second region being readable and writable.

11. The method according to claim 1, wherein said first region is formed of m rows of memory cells, said second region being formed of m+k (with m and k non-zero integers) rows of memory cells or of m rows of memory cells and is associated with a register file of size not less than k.

12. The method according to claim 1, wherein the cells of the first region have a given probability of being established in a first logic state following the first biased initialisation, the method further comprising, prior to said first biased initialisation, a step of setting means for controlling the initialisation of the SRAM, and adjusting said given probability.

13. The method according to claim 12, wherein said given probability is modulated depending on a pulse duration on at least one word line coupled to access transistors of the cells of said first set of cells and applied during said first biased initialisation.

14. A method for controlling a Static Random Access Memory (SRAM) wherein each of cells is provided with a first storage node and a second storage node comprising steps of:

powering up said SRAM;

implementing, a method for generating a cryptographic key from the SRAM, including:

performing a first biased initialisation of a first set of cells located in at least one first region of said SRAM that is a region dedicated to carrying out a physical unclonable function (PUF), and establishing a first logic state, of the cells of said first set, storing in a second set of cells of a second region of said SRAM, the respective states of the cells of said first set and resulting from said first biased initialisation, performing a second biased initialisation of said first set of cells and establishing a setting in a second logic state, complementary to said first logic state, of said cells of said first set, and after the first biased initialisation and the second biased initialisation, establishing an N-bit digital key, from one or more given positions identified in said second region respectively of one or more highly biased to second state cells which belong to said second set and are in the second logic state following said first biased initialisation, and from one or more other positions identified in said first region respectively of one or more highly biased to first state cells which belong to said first set and which are in said first logic state following said second biased initialisation, said digital key forming the cryptographic key or forming a digital word from which an encryption key is formed, the control method further comprising, between said power-up and said implementation of the method for generating a cryptographic key or, after the implementation of said method for generating a cryptographic key, setting the cells of the first region and the second region in an indeterminate state called "metastable" state for which their respective first storage node and their respective second storage node are set to equal or substantially equal potentials.

15. A device comprising:

a Static Random Access Memory (SRAM); and at least one processor that generates a cryptographic key from the SRAM, the at least one processing being configured to perform a first biased initialisation of a first set of cells located in at least one first region of said SRAM that is a region dedicated to carrying out a physical unclonable function (PUF), and establishing a first logic state, of the cells of said first set, store in a second set of cells of a second region of said memory, the respective states of the cells of said first set and resulting from said first biased initialisation , perform a second biased initialisation of said first set of cells and establishing a setting in a second logic state, complementary to said first logic state, of said cells of said first set, and after the first biased initialisation and the second biased initialisation, establish an N-bit digital key, from one or more given positions identified in said second region respectively of one or more highly biased to second state cells which belong to said second set and are in the second logic state following said first biased initialisation, and from one or more other positions identified in said first region respectively of one or more highly biased to first state cells which belong to said first set and which are in said first logic state following said second biased initialisation, said digital key forming the cryptographic key or forming a digital word from which an encryption key is formed.

* * * * *